US011768747B2

(12) United States Patent
Goslen et al.

(10) Patent No.: US 11,768,747 B2
(45) Date of Patent: Sep. 26, 2023

(54) DETECTING SPIKES IN MEMORY USAGE IN A COMPUTER SYSTEM

(71) Applicant: Hewlett Packard Enterprise Development LP, Houston, TX (US)

(72) Inventors: Gregory B. Goslen, Plano, TX (US); Christopher S. Murray, Boynton Beach, FL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 128 days.

(21) Appl. No.: 17/517,494

(22) Filed: Nov. 2, 2021

(65) Prior Publication Data

US 2023/0133975 A1   May 4, 2023

(51) Int. Cl.
| G06F 11/00 | (2006.01) |
| G06F 11/30 | (2006.01) |
| G06F 11/34 | (2006.01) |
| G06F 11/32 | (2006.01) |

(52) U.S. Cl.
CPC ........ *G06F 11/3037* (2013.01); *G06F 11/327* (2013.01); *G06F 11/3433* (2013.01)

(58) Field of Classification Search
CPC ............................ G06F 11/3037; G06F 11/327
See application file for complete search history.

(56) References Cited

U.S. PATENT DOCUMENTS

| 7,308,364 | B2 | 12/2007 | Shaughnessy et al. |
| 7,668,659 | B2 | 2/2010 | Shaughnessy et al. |
| 7,894,992 | B2 | 2/2011 | Shaughnessy et al. |
| 8,660,816 | B2 | 2/2014 | Mukherjee et al. |
| 8,965,718 | B2 | 2/2015 | Zimmermann et al. |
| 9,690,930 | B1 | 6/2017 | Gulko et al. |
| 10,401,380 | B2 | 9/2019 | Loeffler |
| 10,599,502 | B2 * | 3/2020 | Baptist ................ G06F 11/1471 |
| 2011/0276833 | A1 * | 11/2011 | Otenko ................ G06F 11/366 |
| | | | 714/E11.208 |
| 2012/0041293 | A1 | 2/2012 | Levi et al. |
| 2021/0096927 | A1 | 4/2021 | Zhu et al. |

* cited by examiner

*Primary Examiner* — Amine Riad
(74) *Attorney, Agent, or Firm* — Yao Legal Services, Inc.

(57) ABSTRACT

The system determines data which indicate memory usage by a process and information related to a number of instances of the process. The system determines for the process: a first average amount of memory; a first standard deviation; a first value indicating a difference between a current amount of memory used by the process and the first average amount; a second average number of process instances; a second standard deviation; and a second value indicating a difference between a current number of process instances and the second average number. The system performs a corrective action to address a memory spike associated with the process responsive to comparing at least one of: the current amount of memory used by the process with a watermark; the first value with the first standard deviation scaled; the current number of instances with a watermark; and the second value with the second standard deviation scaled.

20 Claims, 12 Drawing Sheets

|  | PRIVATE MEMORY 202 | SHARED MEMORY 204 |
|---|---|---|
| ANONYMOUS (NON-FILE-BACKED) MEMORY 212 | `malloc()`<br>`mmap(PRIVATE, ANON)` | `POSIX shm_open()`<br>`mmap(SHARED, ANON)` |
| FILE-BACKED MEMORY 214 | `mmap(PRIVATE, fd)` | `mmap(SHARED, fd)` |

FIG. 2

TABLE OF MEMORY TYPES

Compute Watermark-Based Criterion for Process Memory

In this case, the watermark was tuned to be 10.0 percent.
Any current memory usage as a percentage of the total available memory which is greater than the watermark is set to be flagged as an alert or a health status with "CRITICAL" level severity.

```
                ----- memory usage (KiB) -----   ----- number of processes -----
process name       average    std dev    spike      average   std dev    spike      Health
--------------  ---------  ---------  ---------   ---------  --------  --------   ----------
python2.7       12432.052  10080.383  96264.948       4.455     3.506    34.000    CRITICAL
```
412 ⟵                                                                           418 ⟵

(1) The watermark severity level was tuned to a value of:              10.0 %        ⟵414
(2) The average memory usage of the python2.7 process is:         12,432.052 KiB.
(3) The standard deviation of python2.7 memory usage is:          10,080.383 KiB.
(4) The current memory usage minus the average is:                96,264.948 KiB.
(5) The current memory usage (2) + (5) is:                       108,696.052 KiB.
(6) The total available memory space is:                       1,024,700.000 KiB.
(7) The current memory usage as a percentage of total is:             10.608 %  = 100% * (5) / (6)
                                                                                         ⟵416
(8) If (7) is greater than (1), report a "CRITICAL" level alert,
    otherwise report health status based on the standard deviation-based criterion

FIG. 4A

Compute Standard Deviation-based Criterion for Process Memory

In this case, the severity limit on the standard deviation-based criterion was tuned to be 7.0. Any deviation from the mean of more than 7.0 standard deviations is set to be flagged as an alert or health status with "WARNING" level severity.

```
                ------ memory usage (KiB) ------    ----- number of processes -----
process name       average    std dev     spike        average    std dev    spike   Health
------------      --------   --------   --------     ---------   --------   ------   -------
sshd              3082.472    878.412   8475.028         5.290      2.251   22.000   WARNING
```

(1) The severity level was tuned to have a value of:       7.0   (this number is dimensionless)
(2) The average memory usage of the "sshd" process is: 3082.472 KiB.
(3) The standard deviation of "sshd" memory usage is:   878.412 KiB.
(4) The standard deviation (3) times severity (1) is:  6148.884 KiB.
(5) The current memory usage minus the average is:     8475.028 KiB.
(6) If (5) is greater than (4), report a "WARNING" level alert,
    otherwise report health status of "OK"

FIG. 4B

Compute Watermark-Based Criterion for Number of Processes

In this case, the watermark was tuned to be 40.000.
Any current number of process instances which is greater than the watermark
is set to be flagged as an alert or a health status with "CRITICAL" level severity.

```
                ------ memory usage (KiB) ------    ------ number of processes ------
process name      average      std dev      spike      average    std dev     spike    Health
--------------------------------------------------------------------------------------
python2.7        12432.052   10080.383    96264.948     4.455      3.506      34.000   WARNING
```

(1) The watermark severity level was tuned to a value of:                     40.000
(2) The average number of instances of the "python2.7" process is:            4.445
(3) The standard deviation of the number of process instances is:             3.506
(4) The current number of process instances minus the average is:             34.000
(5) The current number of process instances is (2) + (4) is:                  38.445
(6) If (5) is greater than (1), report a "CRITICAL" level alert,
    otherwise report health status based on the standard deviation-based criterion

FIG. 4C

Compute Standard Deviation-based Criterion for Number of Processes

In this case, the severity limit on the standard deviation-based criterion was tuned to be 7.0. Any deviation from the mean of more than 7.0 standard deviations is set to be flagged as an alert or health status with "WARNING" level severity.

```
               ------ memory usage (KiB) ------    ----- number of processes -----
process name    average     std dev      spike      average    std dev     spike    Health
--------------------------------------------------------------------------------------------
sshd           3082.472    878.412    8475.028       5.290      2.251     22.000   WARNING
```

(1) The severity level was tuned to have a value of:        7.0   (this number is dimensionless)
(2) The average number of instances of the "sshd" process is:        5.290
(3) The standard deviation of "sshd" process instances is:           2.251
(4) The standard deviation (3) times severity (1) is:               15.757
(5) The current number of instances minus the average is:           22.000
(6) If (5) is greater than (4), report a "WARNING" level alert,
    otherwise report health status of "OK".

In this scenario, the number of processes is at a "WARNING" level, and the memory usage of those processes is at a "WARNING" level also.

FIG. 4D

Check for spikes in process shared memory

Compute Standard Deviation-based Criterion for Number of Processes

| process name | ------- memory usage (KiB) ------- | | | ----- number of processes ----- | | | Health |
| --- | --- | --- | --- | --- | --- | --- | --- |
| | average | std dev | spike | average | std dev | spike | |
| python2.7 | 1224.203 | 447.686 | 3988.797 | 4.455 | 3.506 | 34.000 | WARNING |
| cluster_consist | 336.812 | 131.185 | 2198.688 | 1.000 | 0.000 | 0.000 | WARNING |
| serial_communic | 388.041 | 293.298 | 2106.459 | 1.000 | 0.000 | 0.000 | WARNING |
| sshd | 1522.845 | 125.249 | 1171.655 | 5.290 | 2.251 | 22.000 | WARNING |

Health alerts resulting from the above analysis:

*** 2 CRITICAL Memory Usage health alerts
(process total memory spike, process private memory spike)

*** 7 WARNING Memory Usage health alerts
(total, private, sum of total, sum of private, process total memory spike, process private memory spike, process shared memory spike)

FIG. 5B

DETECTING SPIKES IN MEMORY USAGE IN A COMPUTER SYSTEM

BACKGROUND

Field

This disclosure is generally related to the field of data management. More specifically, this disclosure is related to a method and system for detecting spikes in memory usage in a computer system.

BRIEF DESCRIPTION OF THE FIGURES

FIG. 2 illustrates a table depicting various types of memory used by a process, in accordance with an aspect of the present application.

FIG. 4A illustrates a diagram with steps for detecting a spike in memory usage for process memory based on a configurable watermark, in accordance with an aspect of the present application.

FIG. 4B illustrates a diagram with steps for detecting a spike in memory usage for process memory based on an average, a standard deviation, and a configurable tuning factor, in accordance with an aspect of the present application.

FIG. 4C illustrates a diagram with steps for detecting a spike in memory usage for the number of instances of a process based on a configurable watermark, in accordance with an aspect of the present application.

FIG. 4D illustrates a diagram with steps for detecting a spike in memory usage for the number of instances of a process based on an average, a standard deviation, and a configurable tuning factor, in accordance with an aspect of the present application.

FIG. 5B illustrates a display with multiple standard deviation-based criterion computed for multiple processes for detecting spikes in process shared memory, based on a number of processes, in accordance with an aspect of the present application.

In the figures, like reference numerals refer to the same figure elements.

DETAILED DESCRIPTION

Figure 1:
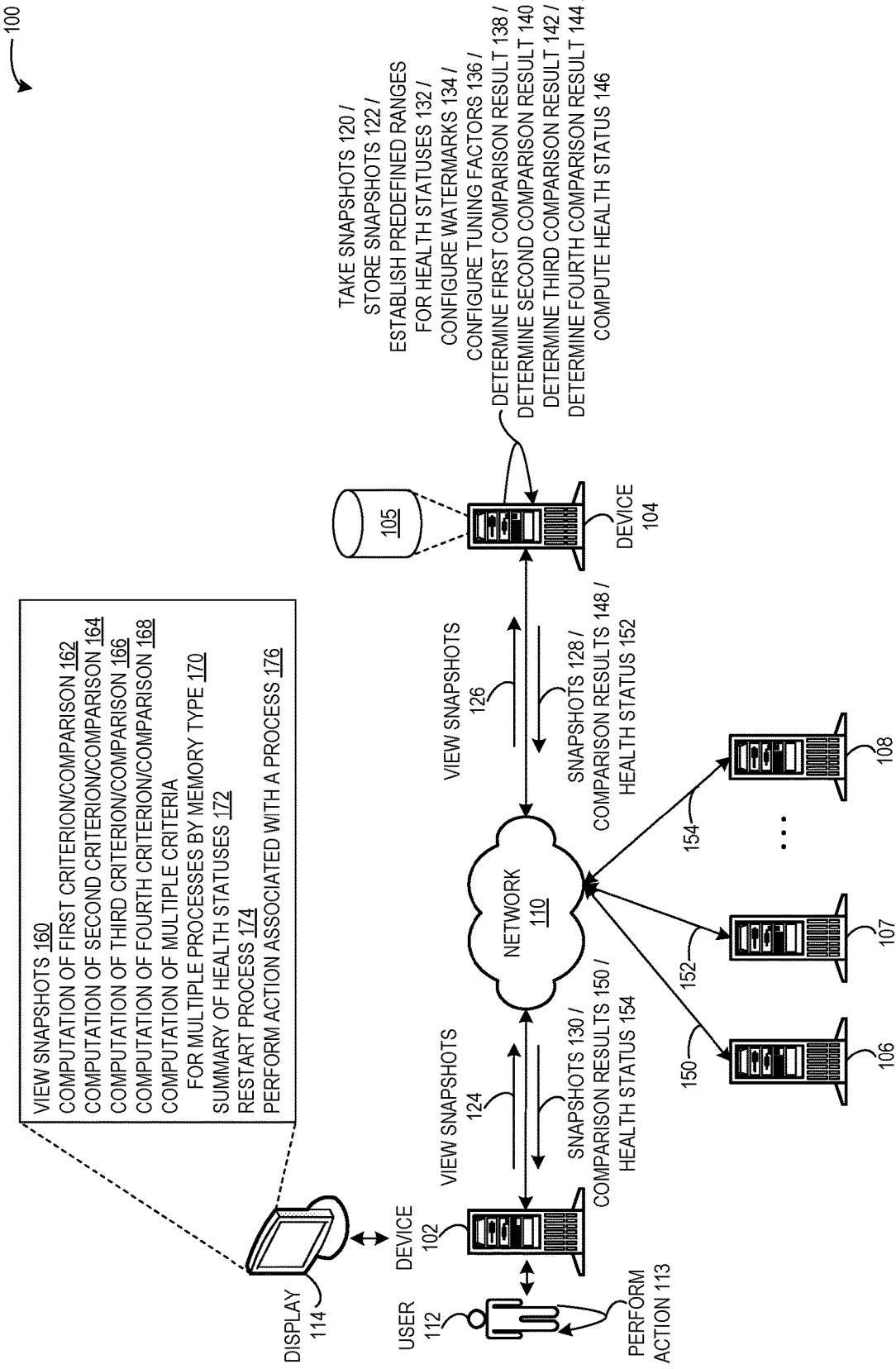
FIG. 1 illustrates an environment with entities and communications which facilitate detecting spikes in memory usage in a computer system, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A computing system can include multiple processes running concurrently. Each process may consume memory of the computing system. If the memory usage of a particular process grows beyond a certain threshold (e.g., out of bounds), the system may need to end and restart the process in order to avoid a full reboot of the system. While many computing systems may operate in a redundant manner (e.g., using an active device and a standby device), it may be desirable to avoid moving from the active device to the standby device.

The described aspects of the present application provide a system which can determine whether the usage of memory by an individual process constitutes as "spike" in memory usage, and allows the system to perform a corrective action to address the spike. A "spike" in memory usage can be defined as a temporary large increase in memory usage. In some instances, a memory spike may not indicate a problem, as computer systems allocate and release memory in chunks of various sizes and at irregular times. However, a memory spike of sufficient size may indicate problems in system behavior which require corrective action, e.g., investigation, mitigation, etc. While some existing algorithms may be designed to detect memory leaks, these algorithms may not detect memory spikes because repeated spikes of a similar height may not contribute to any long-term upward trend in memory usage.

The described aspects provide a system which can detect memory spikes of "excessive" size in the usage of different types of memory, including: private memory (which includes heap memory); heap memory; proportional set size (PSS) shared memory; shared memory; and total memory, which includes private memory and shared memory. The system can determine the "excessive" size based on certain configurable or predetermined numerical limits or criteria (e.g., a watermark or a tuning factor), as described below in relation to FIGS. 4A-4D. These limits can be associated with a health status, which can be one of a plurality of predefined ranges.

The system can determine that a certain process or RAM-based memory segment exhibits a short-term spike in memory usage (of a particular memory type) which exceeds the configurable criteria described herein. By detecting such a spike, the system can log pertinent memory information, alert a user, and perform a corrective action (e.g., killing the process or killing and restarting the process).

The described system can use a memory usage snapshot tool which determines memory usage of various types of memory by each process and by various segments of RAM disk memory. The tool can use facilities provided by an operating system of the computing system to determine how much of each type of memory is currently in use. The tool can generate data points, which can be stored such that data covering a sufficiently large time range is available for analysis by the system.

The described aspects can compute four different criteria. A first criterion is for process memory and can be based on a configurable watermark, e.g., obtaining a percentage of the current memory usage out of the total amount of memory available and comparing that percentage to the configurable watermark. This criterion does not require any previous history or historical data points and can result in the immediate reporting of the occurrence of large spikes without needing to wait for a set of historical data to accumulate, as described below in relation to FIG. 4A.

A second criterion is for process memory and can be based on a mean (i.e., an average amount) of memory usage by a process and a standard deviation, as well as on a configurable tuning factor which represents a number of standard deviations away from the average. The second criterion thus compares a current amount of memory used by the process minus the average amount with the standard deviation scaled or multiplied by the tuning factor, as described below in relation to FIG. 4B.

A third criterion is for the number of processes (or instances of a process) and can be based on a configurable watermark, e.g., comparing the current number of instances/processes to the configurable watermark. As with the first criterion, this third criterion does not require any previous history or historical data points and can result in the immediate reporting of the occurrence of large spikes in the number of process instances without needing to wait for a set of historical data to accumulate, as described below in relation to FIG. 4C. In some aspects, the third criterion may use an amount of stored data which is less than a predetermined threshold.

A fourth criterion is for the number of processes (or process instances) and can be based on a mean (i.e., an average amount) of the number of instances of each process, as well as on a configurable tuning factor which represents a number of standard deviations away from the average. The fourth criterion thus compares a current number of process instances minus the average number of process instances with the standard deviation scaled or multiplied by the configurable tuning factor, as described below in relation to FIG. 4D.

The system can associate each of these four described criterion with a threshold which indicates a health status, which can include a predefined set of ranges based on, e.g., a watermark or a standard deviation scaled by a tuning factor. For example, for the first criterion, which is based on watermarks, the system can determine ranges which correspond to a health status, such as: a range of less than 5% can indicate a health status of "Ok"; a range of 6-10% can indicate a health status of "Warning"; and a range of greater than 10% can indicate a health status of "Critical." As another example, for the second criterion, which is based on the standard deviation and the tuning factor/multiplier, the system can determine ranges which correspond to a health status, such as: a range of less than 3 times greater than the standard deviation can indicate a health status of "OK"; a range of 4-6 times greater than the standard deviation can indicate a health status of "Warning"; and a range of greater than 7 times the standard deviation can indicate a health status of "Critical." The system can trigger performance of a corrective action at or in any of these predefined ranges and/or corresponding health statuses, such as only if the indicated health status is determined to be "Critical" or "Warning." The system can send an alert or notification, e.g., to initiate performance of a corrective action. In some aspects, the system can automatically kill and/or restart a process with a computed criterion which falls within a certain range or corresponds to a certain health status.

The system can display to a user (such as an administrative user) the computation of any of the four criterion described in FIGS. 4A-4D for a given process along with the associated health status (and any recommended corrective action). The system can also display the computation of multiple criteria for multiple processes for each of the given memory types (i.e., private, heap, PSS shared, shared, and total memory), along with the associated health status and any recommended corrective action, as described below in relation to FIG. 5.

The system or the user can define or configure a set of ranges to indicate the health status, and can trigger a notification if a health status (based on a particular computed criterion) falls within a certain range (e.g., by comparing the computed criterion to the predefined ranges or a predetermined threshold). The notification may result in the system or the user performing a corrective action to address a spike in memory usage associated with a particular process, e.g., killing and restarting a process, or notifying/reporting the issue.

Communications Which Facilitate Detecting Spikes in Memory Usage

FIG. 1 illustrates an environment 100 with entities and communications which facilitate detecting spikes in memory usage in a computer system, in accordance with an aspect of the present application. Environment 100 can include: a device 102, an associated user 112, and an associated display screen 114; a device 104 and an associated or included storage device 105; and devices 106, 107, and 108. User 112 can be an administrative user, network administrator, or other user authorized to perform the operations associated with a user described herein. Devices 102, 104, and 106-108 can communicate with each other via a network 110. Device 102 can be a client computing device, e.g., a laptop computer, a mobile telephone, a smartphone, a tablet, a desktop computer, and a handheld device. Devices 102, 104, and 106-108 can be a computing device (e.g., a server, a networked entity, and a communication device) and can include multiple processes which are running at any given time. Devices 106-108 may provide redundancy for each other, e.g., device 106 may be configured as an active device, and device 107 may be configured as the associated standby device.

During operation, device 104 can take or obtain snapshots of memory usage for processes running in devices 106, 107, and 108 (operation 120), via, e.g., communications 150, 152, and 154, by using a memory usage snapshot tool or other similar functionality. Device 104 can obtain these snapshots at predetermined time intervals which can be set by the system or configured by user 112 or another administrative user. The time intervals can also be set to a default value or dynamically changed while the processes are running, and device 104 can take or obtain a real-time memory snapshot. Device 104 can store the snapshots (operation 122), e.g., in storage device 105. In some aspects, devices 106, 107, and 108 can be independent devices which store their own memory snapshots and make their own decisions based on data in those snapshots.

Display 114 can include, indicate, or display various information to user 112, including actionable widgets and selectable lists or elements 160-176, which can be activated or acted upon to send a command to device 104. That is, user 112 can perform an action 113 to activate any of the elements indicated in display 114. For example, user 112 may wish to view memory snapshots for device 106 (element 160). User 112 may also specify to view snapshots from within a certain time period from device 106 and may also select certain snapshots for viewing, e.g., a pair of snapshots for memory usage of processes in a certain device and taken at a certain time (using element 160 and other selectable elements not shown). User 112 can cause device 102 to send, via the activated elements on display 114, a view snapshots 124 command to device 104.

Device 104 can receive command 124 (as a view snapshots 126 command), and can return in response requested snapshots 128. Device 102 can receive snapshots 128 (as snapshots 130), and can display the requested snapshots on display 114 (element 160). Device 104 can also establish predefined ranges for health statuses (operation 132), using system values and/or information provided or configured by user 112. Device 104 can also configure watermarks (operation 134) and tuning factors (operation 136), again using system values and/or information provided or configured by user 112. In some aspects, user 112 (or another user) may establish the ranges for health statuses and configure the watermarks and tuning factors (e.g., via a selectable element on display 114, not shown).

Device 104 can determine, based on data from the snapshots, information related to a process (or processes), including: a first average amount of memory used by the process; a first standard deviation in the amount of memory used by the process; a first value indicating a difference between a current amount of memory used by the process and the first average amount; a second average number of instances of the process; a second standard deviation in the number of instances of the process; and a second value indicating a difference between a current number of instances of the process and the second average number. Device 104 can perform one or more of the following computations/comparisons: determine a first comparison result of the current amount of memory used by the process with a first predetermined watermark (operation 138); determine a second comparison result of the first value with the first standard deviation scaled by a second predetermined tuning factor (operation 140); determine a third comparison result of the current number of instances with a third predetermined watermark (operation 142); and determine a fourth comparison result of the second value with the second standard deviation scaled by a fourth predetermined tuning factor (operation 144). Device 104 can compute a corresponding health status for each of the four comparison results (operation 146), based on results from operations 138-144 and the established ranges (operation 132) and configured watermarks and tuning factors operations 134 and 136, respectively). The health status can be based on exceeding a compared threshold, or falling in a predetermined range based on the compared threshold.

Device 104 can return comparison results 148 to device 102. Device 102 can receive comparison results 148 (as comparison results 150), and can display on display 114: a computation of first criterion/comparison 162 (as described below in relation to FIG. 4A); a computation of second criterion/comparison 164 (as described below in relation to FIG. 4B); a computation of third criterion/comparison 166 (as described below in relation to FIG. 4C); a computation of fourth criterion/comparison 168 (as described below in relation to FIG. 4D); and a computation of multiple criteria for multiple processes by memory type 170 (as described below in relation to FIG. 5A). Device 104 can also return computed health status 152 to device 102. Device 102 can receive health status 152 (as health status 154), and can display on display 114 a summary of health statuses 172 (as described below in relation to FIGS. 5A and 5B).

Upon viewing or obtaining the criterion and health, the system or user 112 can determine to perform a corrective action to address a memory spike associated with a given process viewed as part of elements 162-172, e.g., by sending a restart process command for a given process (element 174) or by performing an action associated with the given process (element 176).

Memory Types; Memory Usage Over Time

In the described aspects, the system or a user (such as an administrator) an configure the time interval at which the memory snapshot tool obtains memory-related information. The interval can also be configured or changed in real time, e.g., if the number and level of memory spikes begin to grow more rapidly over time, the system or user can reduce the interval in order to allow the system to detect these "more frequently occurring spikes" before impacting operation of the overall system.

Each snapshot can indicate information for a set of processes running at the respective time. For example, a first snapshot can indicate memory usage corresponding to various types of memory for a given process as well as memory usage by various segments of random access memory (RAM) disk memory. Two types of general memory can include process memory and files in RAM-based file systems (e.g., tmpfs of Linux). The system can treat process memory and RAM disk memory as separate memory spaces even though both types may reside in the physical RAM memory. RAM disk memory (i.e., file-backed memory) can be subdivided into separate spaces of various fixed sizes which are configurable. Each of these spaces can store files of a particular type, e.g., log files, temporary files, configuration files, etc.

Each process can use two basic types of memory: private memory; and shared memory, as described below in relation to FIG. 2. Private memory can include heap memory and memory-mapped file input/output (I/O). Shared memory can include shared libraries and shared memory, which is memory shared between multiple processes.

FIG. 2 illustrates a table 200 depicting various types of memory used by a process, in accordance with an aspect of the present application. Table 200 indicates four quadrants, and can include private memory 202 and shared memory 204, with each memory type associated with either an anonymous (non-file-backed) memory 212 or a file-backed memory 214. Each memory page of a process may have only one of the four classifications in the quadrants of table 200 at a time. Each quadrant can indicate examples of system calls which can result in the creation of memory corresponding to that quadrant.

For example: a malloc( ) call can result in the creation of private anonymous (non-file-backed) memory, e.g., heap memory; an mmap (PRIVATE, ANON) call can result in the creation of private memory which is also anonymous (non-file-backed and no name or file descriptor is attached); and an mmap (PRIVATE, fd) call can result in the creation of private memory which is filed-backed, with a file descriptor, such as memory-mapped file input/output (I/O). If the system allocates memory on the heap (e.g., by using malloc( )), both the heap and the private memory will increase. If the system allocates memory by using mmap( ), the heap usage stays the same and the private memory increases.

As another example: a POSIX shm_open( ) call can result in the creation of a shared memory object, which opens shared memory but may not save to a file; an mmap (SHARED, ANON) call can result in the creation of shared memory which is anonymous (non-file-backed); and an mmap (SHARED, fd) call can result in the creation of shared memory which is filed-backed, with a file descriptor.

The term "private memory" refers to memory which can be allocated based on the above-described calls, and can include heap memory. As described above, an increase in heap memory can result in an increase in private memory, because heap memory usage may be included in the usage of private memory. However, an increase in private memory does not result in an increase in the usage of heap memory. The term "shared memory" refers to memory which can be allocated based on the above-described calls, and can include memory shared by two or more processes. The term "proportional set size" (PSS) shared memory refers to a proportional amount of memory used by a given process as compared to total memory usage. The shared PSS memory for a process which is using part of, e.g., 100K of shared memory, can increase if no other process or program is using part of the 100K of shared memory. As other processes or programs begin to use the shared memory, the shared memory usage may increase while the shared PSS memory usage may decrease.

Figure 3:
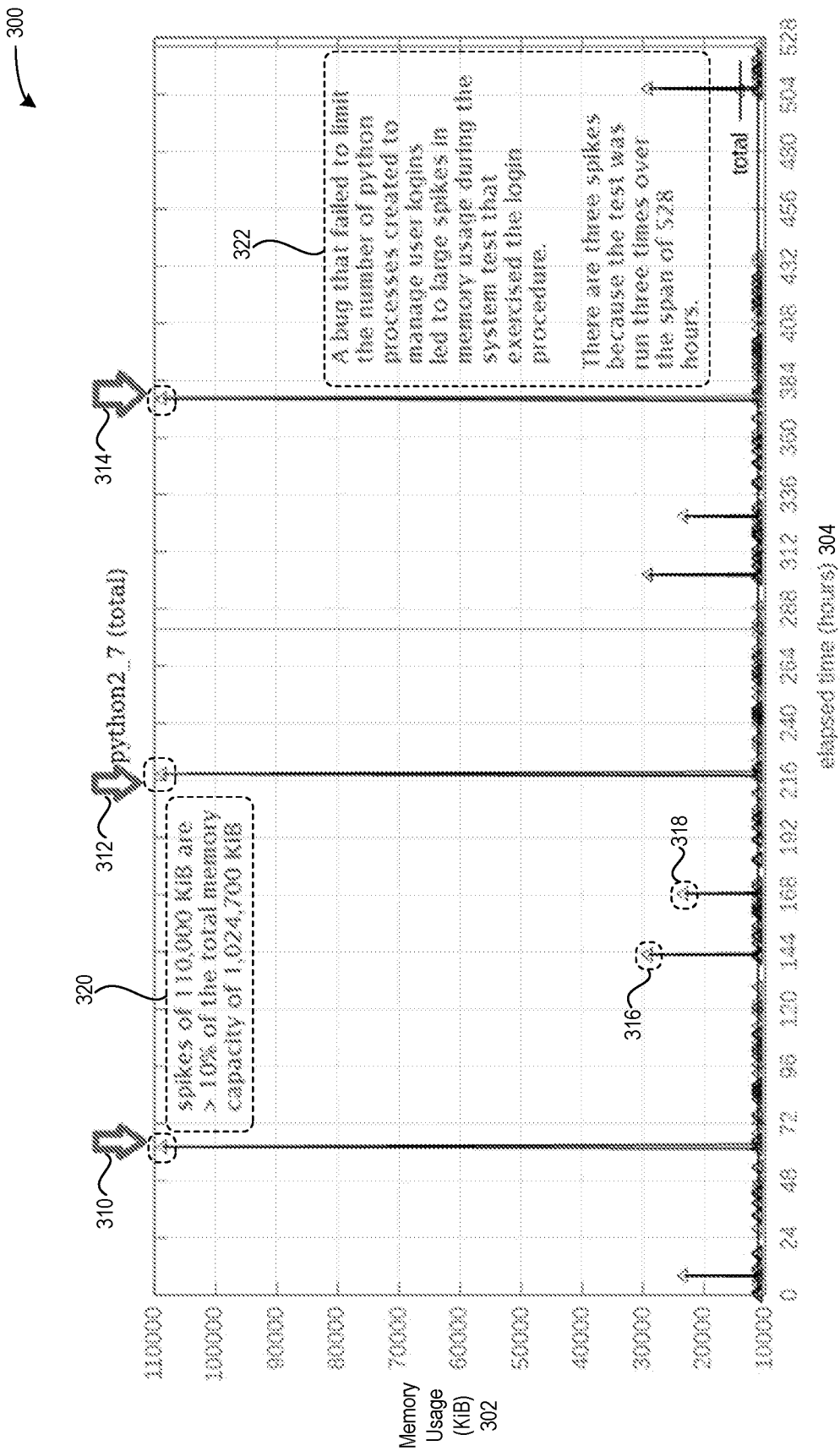
FIG. 3 illustrates a diagram of spikes in memory usage over time, in accordance with an aspect of the present application.

FIG. 3 illustrates a diagram 300 of spikes in memory usage over time, in accordance with an aspect of the present application. Diagram 300 includes an x-axis of elapsed time (in hours) 304 and a y-axis of memory usage (in KB) 302, and depicts total memory (including private and shared memory) usage by a process named "python2_7" over a period of 528 hours. Diagram 300 depicts smaller memory spikes (e.g., as indicated by triangles at 316 and 318) and larger memory spikes (e.g., as indicated by arrows 310, 312, and 314). The triangles indicate points or times during the 528 hours at which certain memory spikes (of varying sizes) are detected. Assume that the total memory capacity is 1,024,700 kilobytes (KB or KiB), and that a first predetermined watermark is set to 10% of the total memory capacity. A note 320 indicates that spikes of 110,000 KB are greater than 10% (i.e., the first predetermined watermark) of the total memory capacity of 1,024,700 KB. A note 322 indicates that a bug that failed to limited the number of python processes created to manage user logins led to large spikes in total memory usage during the system test which exercised the login procedure. Thus, based on the predetermined watermark, diagram 300 indicates three large spikes (at arrows 310, 312, and 314) because the system test was performed three times over the span of 528 hours.

Detecting a Spike in Memory Usage Using Four Criterion

FIG. 4A illustrates a diagram 400 with steps for detecting a spike in memory usage for process memory based on a configurable watermark, in accordance with an aspect of the present application. Diagram 400 indicates that the configurable watermark is tuned to be 10.0%, and that any current memory usage as a percentage of the total available memory which is greater than the watermark will be flagged as an alert or a health status with a "Critical" severity level. Using information 412 relating to the memory usage for the process "python2.7," the system can determine or perform steps 401-408. Step 401 indicates that the watermark severity level was tuned to a value of 10.0%. Step 402 indicates that the average memory usage of the python2.7 process is 12,432.052 KB. Step 403 indicates that the standard deviation of python memory usage is 10,080.383 KB. Step 404 indicates that the current memory usage minus the average (also labeled as a "spike" in information 412) is 96,264.948 KB. Step 405 indicates that the current memory usage is 108,696.052 KB. Step 406 indicates that the total available memory space is 1,024,700.000 KB. Step 407 indicates that the current memory usage as a percentage of the total is 10.608%. Finally, step 408 indicates that if the result of step 407 (a value 416) is greater than step 401 (a value 414), the system can report a "Critical" level alert for the health status of the python2.7 process. If the result of step 407 (value 416) is not greater than step 401 (value 414), the system can report a health status based on the standard deviation-based criterion (e.g., similar to the process described below for the process named "sshd" depicted in FIG. 4B). In this case, because the current memory usage as a percentage of the total (10.608% shown in value 416) is greater than the configured watermark (10.0% shown in value 414), the system can determine and display the comparison result of "Critical" for the health status of this process (a value 418).

FIG. 4B illustrates a diagram 420 with steps for detecting a spike in memory usage for process memory based on an average, a standard deviation, and a configurable tuning factor, in accordance with an aspect of the present application. Diagram 420 indicates that the severity limit on the standard deviation-based criterion is set to 7.0, and that any deviation from the mean of more than 7.0 standard deviations will be flagged as an alert or a health status with a "Warning" severity level. Using information 432 relating to the memory usage for the process "sshd," the system can determine or perform steps 421-426. Step 421 indicates that the severity level was tuned to a value of 7.0 (which is a dimensionless number). Step 422 indicates that the average memory usage of the sshd process is 3082.472 KB. Step 423 indicates that the standard deviation of sshd memory usage is 878.412 KB. Step 424 indicates that the standard deviation times the severity (or tuning factor) is 6148.884 KB. Step 425 indicates that the current memory usage minus the average (also labeled as a "spike" in information 432) is 8475.028 KB. Finally, step 426 indicates that if the result of step 425 (a value 436) is greater than the result of step 424 (a value 434), the system can report a "Warning" level alert for the health status of the sshd process. If the result of step 425 (value 436) is not greater than the result of step 424 (a value 434), the system can report a health status of "Ok," In this case, because the difference between the current memory usage and the average (8475.028 KB as shown in value 436) is greater than the standard deviation scaled by the severity or tuning factor (6148.884 KB as shown in value 434), the system can determine and display the comparison result of "Warning" for the health status of this process (a value 438).

FIG. 4C illustrates a diagram 440 with steps for detecting a spike in memory usage for the number of instances of a process based on a configurable watermark, in accordance with an aspect of the present application. Diagram 440 indicates that the configurable watermark is tuned to be 10.0%, and that any current memory usage as a percentage of the total available memory which is greater than the watermark will be flagged as an alert or a health status with a "Critical" severity level. Using information 452 relating to the number of processes/instances for the process "python2.7," the system can determine or perform steps 441-448. Step 441 indicates that the watermark severity level was tuned to a value of 40.000. Step 442 indicates that the average number of instances of the python2.7 process is 4.445. Step 443 indicates that the standard deviation of the number of process instances is 3.506. Step 444 indicates that the current number of process instances minus the average (also labeled as a "spike" in information 452) is 34.000. Step 445 indicates that the current number of process instances is 38.445. Finally, step 446 indicates that if the result of step 445 (a value 456) is greater than step 451 (a value 454), the system can report a "Critical " level alert for the health status of the python2.7 process. If the result of step 445 (value 456) is not greater than step 451 (value 454), the system can report a health status based on the standard deviation-based criterion.

In this case, because the current number of process instances (38.445 shown in value 456) is not greater than the configured watermark (40.000 shown in value 454), the system can compute the health status based on the standard deviation-based criterion, similar to the process described below for the sshd process depicted in FIG. 4D). Using that process, and assuming a tuning factor of 7.0 and a corresponding health status of "Warning," the system can determine that the difference between the current number of process instances and the average (i.e., 34.000) is greater than the standard deviation scaled by the severity or tuning factor (i.e., 3.506×7.0=24.542), and can thus determine and display the comparison result of "Warning" for the health status of this process (a value 458).

FIG. 4D illustrates a diagram 460 with steps for detecting a spike in memory usage for the number of instances of a process based on an average, a standard deviation, and a configurable tuning factor, in accordance with an aspect of the present application. Diagram 460 indicates that the severity limit on the standard deviation-based criterion is set to 7.0, and that any deviation from the mean of more than 7.0 standard deviations will be flagged as an alert or a health status with a "Warning" severity level. Using information 472 relating to the number of processes/instances for the process "sshd," the system can determine or perform steps 461-466. Step 461 indicates that the severity level was tuned to a value of 7.0 (which is a dimensionless number). Step 462 indicates that the average number of instances of the sshd process is 5.290. Step 463 indicates that the standard deviation of sshd process instances is 2.251. Step 464 indicates that the standard deviation times the severity (or tuning factor) is 15.757. Step 465 indicates that the current number of instances minus the average (also labeled as a "spike" in information 472) is 22.000. Finally, step 466 indicates that if the result of step 465 (a value 476) is greater than the result of step 464 (a value 474), the system can report a "Warning" level alert for the health status of the sshd process. If the result of step 466 (value 476) is not greater than the result of step 464 (value 474), the system can report a health status of "Ok." In this case, because the difference between the current number of instances and the average (22.000 as shown in value 476) is greater than the standard deviation scaled by the severity or tuning factor (15.757 as shown in value 474), the system can determine and display the comparison result of "Warning" for the health status of this process (a value 478).

Thus, the diagrams in FIGS. 4A-4D illustrate that the system can use one or more criterion to determine the health status of a process and how to handle a potential memory spike. For example, for the first, second, and fourth criterion depicted, respectively, in FIG. 4A based on a memory usage watermark, in FIG. 4B based on a memory usage standard deviation, and in FIG. 4D based on a number of instances standard deviation), the system used only a single criterion to determine the health status. In some aspects, the system can include a rule with conditional logic to apply in handling computation of the health status for a given process. For the third criterion depicted in FIG. 4C based on a number of instances watermark, the system used both the watermark-based and the standard deviation-based criterion, because the system included a rule (as depicted by step 446) with conditional logic to apply in handling computation of the health status for the python2.7 process.

The system or user can set one or more rules with conditional logic for handling computation of the health status of a single process or a group of processes, and the logic can include using one, some, all, or any combination of the four criterion disclosed herein.

Figure 5A:
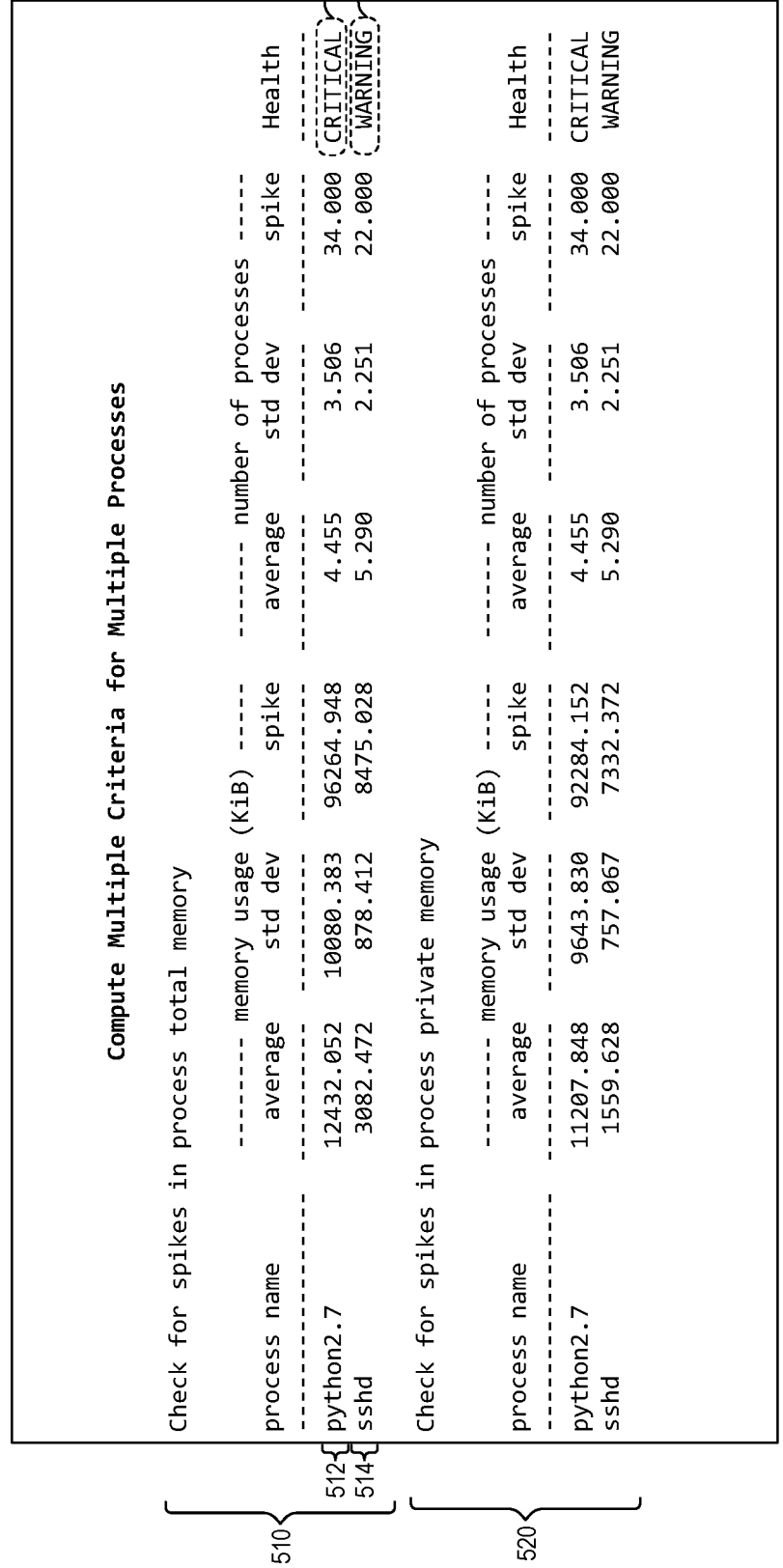
FIG. 5A illustrates a display with multiple criterion computed for multiple processes for detecting spikes in various types of memory, including process total memory and process private memory, in accordance with an aspect of the present application.

Displayed Results of Multiple Criterion for Multiple Processes in Various Memory Types FIG. 5A illustrates a display 500 with multiple criterion computed for multiple processes for detecting spikes in various types of memory, including process total memory and process private memory, in accordance with an aspect of the present application. Display 500 can include results 510 of checking for spikes in process total memory (which includes private and shared memory) and results 520 of checking for spikes in process private memory. Display 500 can include, for each process, memory usage for a respective process and information related to a number of instances of a respective process, including: a first average amount of memory used by the process; a first standard deviation in the amount of memory used by the process; a first value indicating a difference between a current amount of memory used by the process and the first average amount (indicated as a "spike"); a second average number of instances of the process; a second standard deviation in the number of instances of the process; a second value indicating a difference between a current number of instances of the process and the second average number (also indicated as a "spike"); and a health status for the process. For example: a line 512 can correspond to the first criterion which is computed in FIG. 4A and corresponds to a health status of "Critical" (a value 516); and a line 514 can correspond to the second criterion which is computed in FIG. 4B and corresponds to a health status of "Warning" (a value 518).

FIG. 5B illustrates a display 540 with multiple standard deviation-based criterion computed for multiple processes for detecting spikes in process shared memory, based on a number of processes, in accordance with an aspect of the present application. Display 540 can include results 550 of checking for spikes in process shared memory, by computing the standard deviation-based criterion for the number of processes (based on information 550 relating to the number of processes/instances for the listed processes). Display 540 can include information similar to that described above for FIG. 5A. For example: a line 542 can correspond to the third criterion which is computed in FIG. 4C (with an additional computation based on FIG. 4D) and corresponds to a health status of "Warning" (a value 546); and a line 544 can correspond to the fourth criterion which is computed in FIG. 4D and corresponds to a health status of "Warning" (a value 548).

Display 540 can also include a summary section 560, which includes health alerts resulting from certain analysis, which in this case includes results 510 and 520 of FIG. 5A and results 550 of FIG. 5B. Summary section 560 can include a total number of alerts for each predefined range for a health condition or health status, and can also list the memory type associated with a process in each alert. Summary section 560 can also include actionable widgets or graphical user elements which a user may select to initiate performing a corrective action (not shown), as described above in relation to elements 172, 174, and 176 of FIG. 1.

Method Which Facilitates Detecting Spikes in Memory Usage

Figure 6:
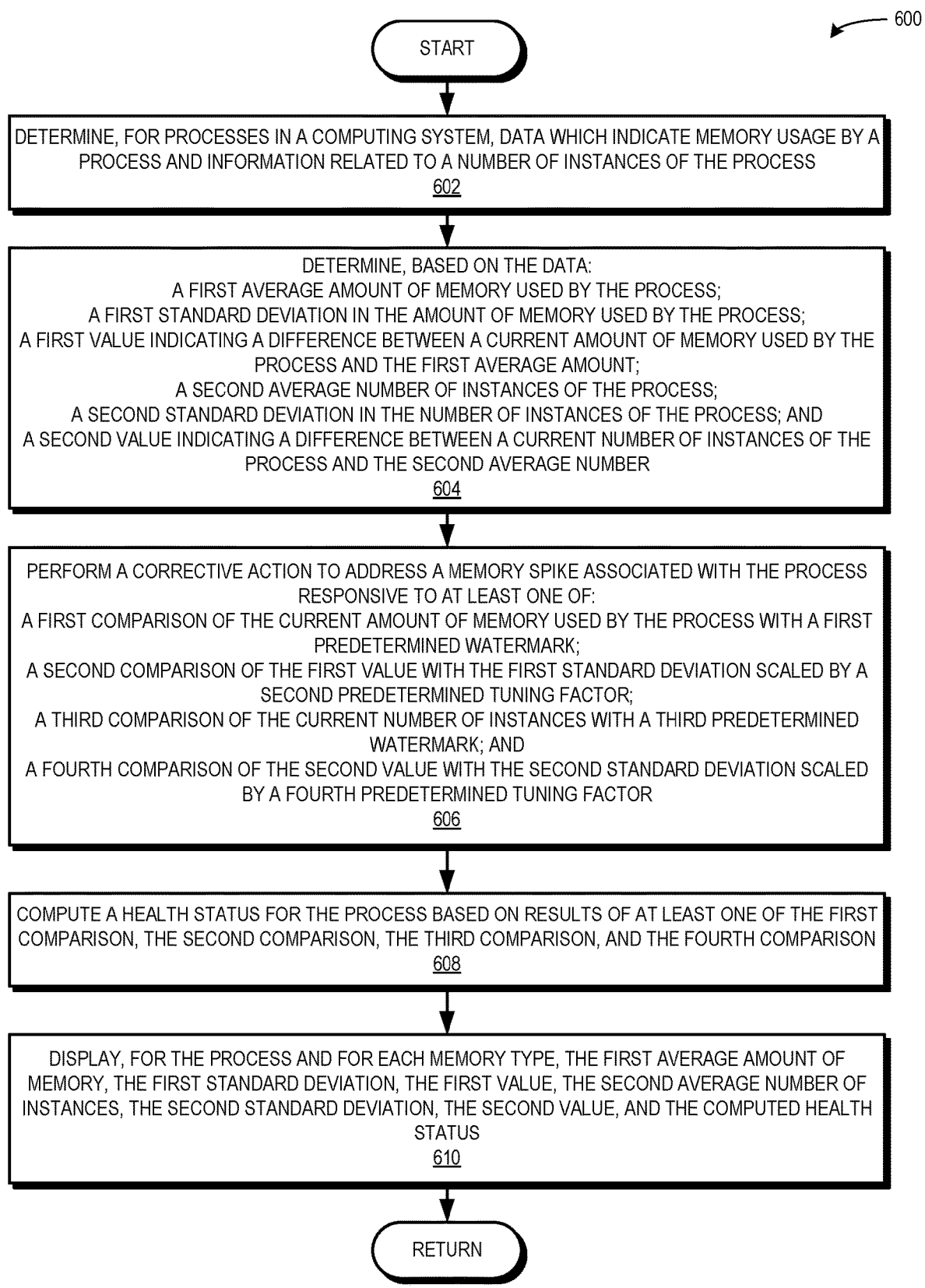
FIG. 6 presents a flowchart illustrating a method which facilitates detecting spikes in memory usage in a computer system, in accordance with an aspect of the present application.

FIG. 6 presents a flowchart 600 illustrating a method which facilitates detecting spikes in memory usage in a computer system, in accordance with an aspect of the present application. During operation, the system determines, for processes in a computing system, data which indicate memory usage by a process and information related to a number of instances of the process (operation 602). The system determines, based on the data: a first average amount of memory used by the process; a first standard deviation in the amount of memory used by the process; a first value indicating a difference between a current amount of memory used by the process and the first average amount; a second average number of instances of the process; a second standard deviation in the number of instances of the process; and a second value indicating a difference between a current number of instances of the process and the second average number (operation 604). The system performs a corrective action to address a memory spike associated with the process responsive to at least one of: a first comparison of the current amount of memory used by the process with a first predetermined watermark; a second comparison of the first value with the first standard deviation scaled by a second predetermined tuning factor; a third comparison of the current number of instances with a third predetermined watermark; and a fourth comparison of the second value with the second standard deviation scaled by a fourth predetermined tuning factor (operation 606). The first predetermined watermark, the first standard deviation scaled by the second predetermined tuning factor, the third predetermined watermark, and the second standard deviation scaled by the fourth predetermined tuning factor can be associated with a threshold which indicates a health status which triggers performing the corrective action.

The system computes a health status for the process based on results of at least one of the first comparison, the second comparison, the third comparison, and the fourth comparison (operation 608). The system displays, for the process and for each memory type, the first average amount of memory, the first standard deviation, the first value, the second average number of instances, the second standard deviation, the second value, and the computed health status (operation 610). The operation returns.

Computer System and Apparatus

Figure 7:
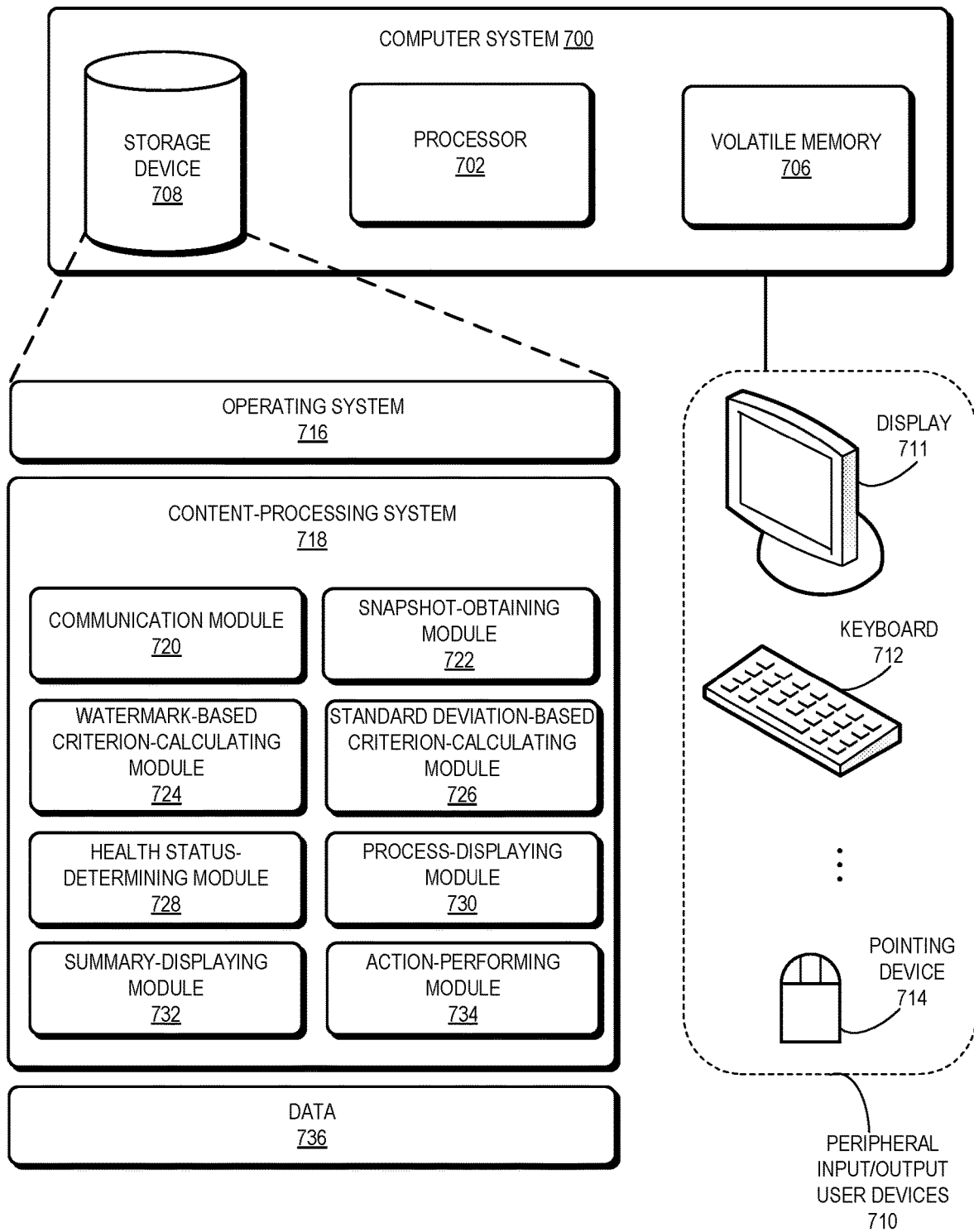
FIG. 7 illustrates a computer system which facilitates detecting spikes in memory usage in a computer system, in accordance with an aspect of the present application.

FIG. 7 illustrates a computer system 700 which facilitates detecting spikes in memory usage in a computer system, in accordance with an aspect of the present application. Computer system 700 includes a processor 702, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via processor 702. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, requests, and commands (communication module 720).

Content-processing system 718 can further include instructions for determining, for processes in a computing system, data which indicate memory usage by a process and information related to a number of instances of the process (snapshot-obtaining module 722). Content-processing system 718 can include instructions for determining, based on the data: a first average amount of memory used by the process; a first standard deviation in the amount of memory used by the process; a first value indicating a difference between a current amount of memory used by the process and the first average amount; a second average number of instances of the process; a second standard deviation in the number of instances of the process; and a second value indicating a difference between a current number of instances of the process and the second average number (snapshot-obtaining module 722). Content-processing system 718 can also include instructions for performing a corrective action to address a memory spike associated with the process (action-performing module 734) responsive to at least one of: a first comparison of the current amount of memory used by the process with a first predetermined watermark (watermark-based criterion-calculating module 724); a second comparison of the first value with the first standard deviation scaled by a second predetermined tuning factor (standard deviation-based criterion-calculating module 726); a third comparison of the current number of instances with a third predetermined watermark (watermark-based criterion-calculating module 724); and a fourth comparison of the second value with the second standard deviation scaled by a fourth predetermined tuning factor (standard deviation-based criterion-calculating module 726).

Content-processing system 718 can additionally include instructions for computing a health status based on results of at least one of the first comparison, second comparison, the third comparison, and the fourth comparison, wherein the first predetermined watermark, the first standard deviation scaled by the second predetermined tuning factor, the third predetermined watermark, and the second standard deviation scaled by the fourth predetermined tuning factor are associated with a threshold indicating the health status which triggers performing the corrective action (health status-determining module 728).

Content-processing system 718 can further include instructions for displaying, for the process and for each memory type, the first average amount of memory, the first standard deviation, the first value, the second average number of instances, the second standard deviation, the second value, and the computed health status (process-displaying module 730). Content-processing system 718 can include instructions for displaying a summary of the health status of multiple processes for multiple criteria (as described above in relation to FIG. 5B) (summary-displaying module 732).

Data 736 can include any data that is required as input or generated as output by the methods and/or processes described in this disclosure. Specifically, data 736 can store at least: a process; a set or list of processes; data; memory usage by a process; information related to a number of instances of a process; a first average amount of memory used by the process; a first standard deviation in the amount of memory used by the process; a first value indicating a difference between a current amount of memory used by the process and the first average amount; a second average number of instances of the process; a second standard deviation in the number of instances of the process; a second value indicating a difference between a current number of instances of the process and the second average number; a result of a comparison; a corrective action; an indicator of a memory spike associated with a process; an amount of a certain type of memory usage, including heap memory, private memory, shared memory, PSS shared memory, and total memory; a threshold; a health status or a health condition; a predetermined watermark; a predetermined tuning factor; a predetermined range; and a number.

Figure 8:
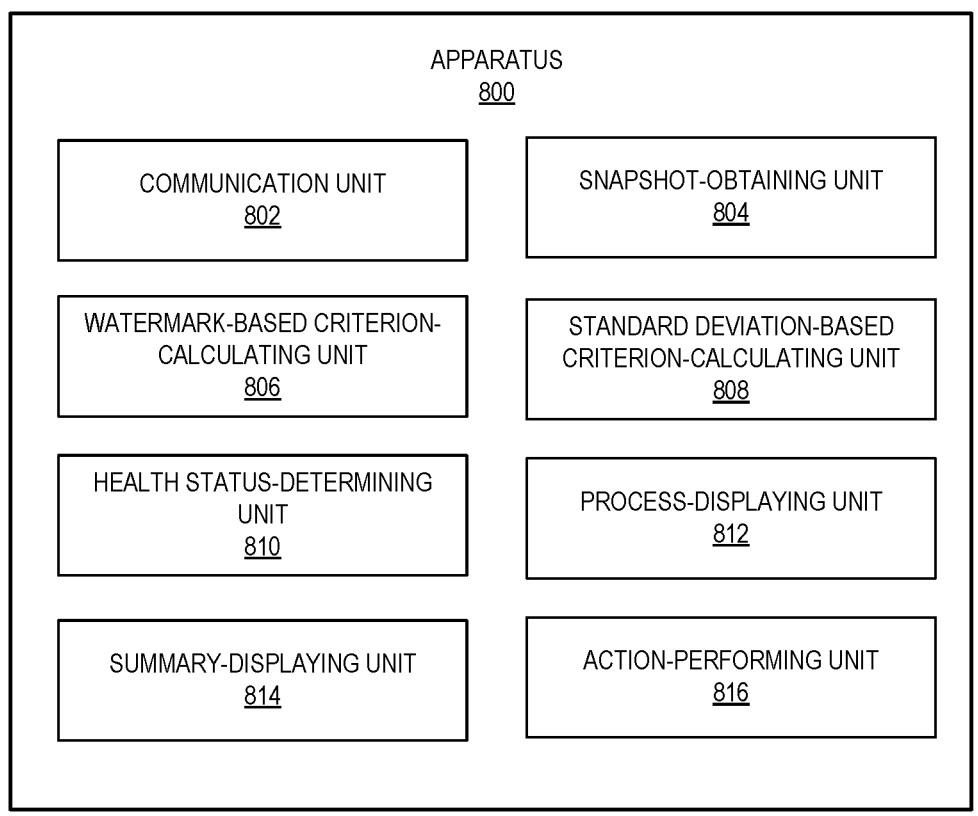
FIG. 8 illustrates an apparatus which facilitates detecting spikes in memory usage in a computer system, in accordance with an aspect of the present application.

FIG. 8 illustrates an apparatus 800 which facilitates detecting spikes in memory usage in a computer system, in accordance with an aspect of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 may also include a non-volatile storage system or a memory management unit. Apparatus 800 can comprise modules or units 802-816 which are configured to perform functions or operations similar to modules 720-734 of computer system 700 of FIG. 7, including: a communication unit 802; a snapshot-obtaining unit 804; a watermark-based criterion-calculating unit 806; a standard deviation-based criterion-calculating unit 808; a health status-determining unit 810; a process-displaying unit 812; a summary-displaying unit 814; and an action-performing unit 816.

In general, the disclosed aspects provide a system which facilitates detecting spikes in memory usage in a computer system. In one aspect, during operation, the system determines, for processes in a computing system, data which indicate memory usage by a process and information related to a number of instances of the process. The system determines, based on the data: a first average amount of memory used by the process; a first standard deviation in the amount of memory used by the process; a first value indicating a difference between a current amount of memory used by the process and the first average amount; a second average number of instances of the process; a second standard deviation in the number of instances of the process; and a second value indicating a difference between a current number of instances of the process and the second average number. The system performs a corrective action to address a memory spike associated with the process responsive to at least one of: a first comparison of the current amount of memory used by the process with a first predetermined watermark; a second comparison of the first value with the first standard deviation scaled by a second predetermined tuning factor; a third comparison of the current number of instances with a third predetermined watermark; and a fourth comparison of the second value with the second standard deviation scaled by a fourth predetermined tuning factor.

In a further variation on this aspect, performing the corrective action is based on at least one of: determining that the first comparison indicates that the current amount of memory used by the process is greater than the first predetermined watermark; determining that the second comparison indicates that the first value is greater than the first standard deviation scaled by the second predetermined tuning factor; determining that the third comparison indicates that the current number of instances is greater than the third predetermined watermark; and determining that the fourth comparison indicates that the second value is greater than the second standard deviation scaled by the fourth predetermined tuning factor.

In a further variation on this aspect, the first predetermined watermark, the first standard deviation scaled by the second predetermined tuning factor, the third predetermined watermark, and the second standard deviation scaled by the fourth predetermined tuning factor are associated with a threshold indicating a health status which triggers performing the corrective action.

In a further variation, the health status comprises a plurality of predefined ranges based on at least one of: one or more numbers less than the first predetermined watermark; the first standard deviation scaled by one or more predetermined tuning factors which are less than the second predetermined tuning factor; one or more numbers less than the third predetermined watermark; and the second standard deviation scaled by one or more predetermined tuning factors which are less than the fourth predetermined tuning factor.

In a further variation, the system computes the health status based on results of at least one of the first comparison, the second comparison, the third comparison, and the fourth comparison.

In a further variation, the system displays, for the process, the first average amount of memory, the first standard deviation, the first value, the second average number of instances, the second standard deviation, the second value, and the computed health status.

In a further variation, the memory usage by the process comprises at least one of the following memory types: private memory used by the process; heap memory used by the process; proportional set size (PSS) shared memory used by the process; shared memory used by the process; and total memory used by the process, wherein the total memory includes the private memory and the shared memory used by the process.

In a further variation, the system displays, for the process and for each memory type, the first average amount of memory, the first standard deviation, the first value, the second average number of instances, the second standard deviation, the second value, and the computed health status.

In a further variation, the system stores the determined data for the process. The first comparison and the third comparison are performed without using the stored data, and the second comparison and the fourth comparison are performed using a first amount of the stored data, wherein the first amount is greater than a first predetermined threshold.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
    determining, for processes in a computing system, data which indicate memory usage by a process and information related to a number of instances of the process;
    determining, based on the data:
        a first average amount of memory used by the process;
        a first standard deviation in the amount of memory used by the process;
        a first value indicating a difference between a current amount of memory used by the process and the first average amount;
        a second average number of instances of the process;
        a second standard deviation in the number of instances of the process; and
        a second value indicating a difference between a current number of instances of the process and the second average number;
    performing a corrective action to address a memory spike associated with the process responsive to at least one of:
        a first comparison of the current amount of memory used by the process with a first predetermined watermark;
        a second comparison of the first value with the first standard deviation scaled by a second predetermined tuning factor;
        a third comparison of the current number of instances with a third predetermined watermark; and
        a fourth comparison of the second value with the second standard deviation scaled by a fourth predetermined tuning factor.

2. The method of claim 1, wherein performing the corrective action is based on at least one of:
    determining that the first comparison indicates that the current amount of memory used by the process is greater than the first predetermined watermark;
    determining that the second comparison indicates that the first value is greater than the first standard deviation scaled by the second predetermined tuning factor;
    determining that the third comparison indicates that the current number of instances is greater than the third predetermined watermark; and
    determining that the fourth comparison indicates that the second value is greater than the second standard deviation scaled by the fourth predetermined tuning factor.

3. The method of claim 1,
    wherein the first predetermined watermark, the first standard deviation scaled by the second predetermined tuning factor, the third predetermined watermark, and the second standard deviation scaled by the fourth predetermined tuning factor are associated with a threshold indicating a health status which triggers performing the corrective action.

4. The method of claim 3, wherein the health status comprises a plurality of predefined ranges based on at least one of:
    one or more numbers less than the first predetermined watermark;
    the first standard deviation scaled by one or more predetermined tuning factors which are less than the second predetermined tuning factor;
    one or more numbers less than the third predetermined watermark; and
    the second standard deviation scaled by one or more predetermined tuning factors which are less than the fourth predetermined tuning factor.

5. The method of claim 3, further comprising:
    computing the health status based on results of at least one of the first comparison, the second comparison, the third comparison, and the fourth comparison.

6. The method of claim 5, further comprising:
    displaying, for the process, the first average amount of memory, the first standard deviation, the first value, the second average number of instances, the second standard deviation, the second value, and the computed health status.

7. The method of claim 5, wherein the memory usage by the process comprises at least one of the following memory types:
    private memory used by the process;
    heap memory used by the process;
    proportional set size (PSS) shared memory used by the process;
    shared memory used by the process; and
    total memory used by the process, wherein the total memory includes the private memory and the shared memory used by the process.

8. The method of claim 7, further comprising:
    displaying, for the process and for each memory type, the first average amount of memory, the first standard deviation, the first value, the second average number of instances, the second standard deviation, the second value, and the computed health status.

9. The method of claim 1, further comprising:
    storing the determined data for the process,
    wherein the first comparison and the third comparison are performed without using the stored data, and
    wherein the second comparison and the fourth comparison are performed using a first amount of the stored data, wherein the first amount is greater than a first predetermined threshold.

10. A computer system, comprising:
    a processor; and
    a memory coupled to the processor and storing instructions which, when executed by the processor, cause the processor to perform a method, the method comprising:
        determining, for processes in a computing system, data which indicate memory usage by a process and information related to a number of instances of the process;
        determining, based on the data:
            a first average amount of memory used by the process;
            a first standard deviation in the amount of memory used by the process;
            a first value indicating a difference between a current amount of memory used by the process and the first average amount;
            a second average number of instances of the process;
            a second standard deviation in the number of instances of the process; and
            a second value indicating a difference between a current number of instances of the process and the second average number;

performing a corrective action to address a memory spike associated with the process responsive to at least one of:
  a first comparison of the current amount of memory used by the process with a first predetermined watermark;
  a second comparison of the first value with the first standard deviation scaled by a second predetermined tuning factor;
  a third comparison of the current number of instances with a third predetermined watermark; and
  a fourth comparison of the second value with the second standard deviation scaled by a fourth predetermined tuning factor.

11. The computer system of claim 10, wherein performing the corrective action is based on at least one of:
  determining that the first comparison indicates that the current amount of memory used by the process is greater than the first predetermined watermark;
  determining that the second comparison indicates that the first value is greater than the first standard deviation scaled by the second predetermined tuning factor;
  determining that the third comparison indicates that the current number of instances is greater than the third predetermined watermark; and
  determining that the fourth comparison indicates that the second value is greater than the second standard deviation scaled by the fourth predetermined tuning factor.

12. The computer system of claim 10,
  wherein the first predetermined watermark, the first standard deviation scaled by the second predetermined tuning factor, the third predetermined watermark, and the second standard deviation scaled by the fourth predetermined tuning factor are associated with a threshold indicating a health status which triggers performing the corrective action.

13. The computer system of claim 12, wherein the method further comprises:
  computing the health status based on results of at least one of the first comparison, the second comparison, the third comparison, and the fourth comparison.

14. The computer system of claim 13, wherein the method further comprises:
  displaying, for the process, the first average amount of memory, the first standard deviation, the first value, the second average number of instances, the second standard deviation, the second value, and the computed health status.

15. The computer system of claim 13,
  wherein the memory usage by the process comprises at least one of the following memory types:
    private memory used by the process;
    heap memory used by the process;
    proportional set size (PSS) shared memory used by the process;
    shared memory used by the process; and
    total memory used by the process, wherein the total memory includes the private memory and the shared memory used by the process, and
  wherein the method further comprises:
    displaying, for the process and for each memory type, the first average amount of memory, the first standard deviation, the first value, the second average number of instances, the second standard deviation, the second value, and the computed health status.

16. A non-transitory computer-readable storage medium storing instructions that when executed by a computer cause the computer to perform a method, the method comprising:
  determining, for processes in a computing system, data which indicate memory usage by a process and information related to a number of instances of the process;
  determining, based on the data:
    a first average amount of memory used by the process;
    a first standard deviation in the amount of memory used by the process;
    a first value indicating a difference between a current amount of memory used by the process and the first average amount;
    a second average number of instances of the process;
    a second standard deviation in the number of instances of the process; and
    a second value indicating a difference between a current number of instances of the process and the second average number;
  performing a corrective action to address a memory spike associated with the process responsive to at least one of:
    a first comparison of the current amount of memory used by the process with a first predetermined watermark;
    a second comparison of the first value with the first standard deviation scaled by a second predetermined tuning factor;
    a third comparison of the current number of instances with a third predetermined watermark; and
    a fourth comparison of the second value with the second standard deviation scaled by a fourth predetermined tuning factor.

17. The storage medium of claim 16, wherein performing the corrective action is based on at least one of:
  determining that the first comparison indicates that the current amount of memory used by the process is greater than the first predetermined watermark;
  determining that the second comparison indicates that the first value is greater than the first standard deviation scaled by the second predetermined tuning factor;
  determining that the third comparison indicates that the current number of instances is greater than the third predetermined watermark; and
  determining that the fourth comparison indicates that the second value is greater than the second standard deviation scaled by the fourth predetermined tuning factor.

18. The storage medium of claim 16,
  wherein the first predetermined watermark, the first standard deviation scaled by the second predetermined tuning factor, the third predetermined watermark, and the second standard deviation scaled by the fourth predetermined tuning factor are associated with a threshold indicating a health status which triggers performing the corrective action, and
  wherein the method further comprises:
    computing the health status based on results of at least one of the first comparison, the second comparison, the third comparison, and the fourth comparison.

19. The storage medium of claim 18, wherein the method further comprises:
  displaying, for the process based on a memory type, the first average amount of memory, the first standard deviation, the first value, the second average number of instances, the second standard deviation, the second value, and the computed health status.

20. The storage medium of claim 19, wherein the memory type comprises at least one of:
- private memory used by the process;
- heap memory used by the process;
- proportional set size (PSS) shared memory used by the process;
- shared memory used by the process; and
- total memory used by the process, wherein the total memory includes the private memory and the shared memory used by the process.

* * * * *